United States Patent
Suzuki et al.

(10) Patent No.: US 6,756,871 B1
(45) Date of Patent: Jun. 29, 2004

(54) ACTUATOR WITH NUMBER OF STATOR TEETH EQUAL TO NUMBER OF ROTOR POLES

(75) Inventors: Yuzuru Suzuki, Shizuoka-ken (JP); Sakae Fujitani, Shizuoka-ken (JP); Masaki Kagawa, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/453,772

(22) Filed: Dec. 3, 1999

(30) Foreign Application Priority Data

Mar. 12, 1998 (JP) .......................................... 10-344528

(51) Int. Cl.[7] .......................... H01F 7/08; H02K 37/00; H02K 1/12; H02K 21/12; H02K 5/16
(52) U.S. Cl. .................... 335/229; 310/49 R; 310/257; 310/156.46; 310/90
(58) Field of Search ............................... 310/117, 116, 310/81, 257, 174, 163, 49 A, 15, 49 R, 46, 261, 40 MM, 156.38–156.47; 335/272, 270, 220, 229, 230

(56) References Cited

U.S. PATENT DOCUMENTS

| | | | |
|---|---|---|---|
| 3,495,113 A | * 2/1970 | Haydon | 310/164 |
| 3,553,512 A | * 1/1971 | Wolfgang et al. | 310/174 |
| 4,127,802 A | * 11/1978 | Johnson | 318/696 |
| 4,274,026 A | * 6/1981 | Haydon et al. | 310/254 |
| 4,644,211 A | * 2/1987 | Idogaki et al. | 335/272 |
| 4,656,381 A | * 4/1987 | Komatsu | 310/257 |
| 4,891,567 A | * 1/1990 | Fujitani et al. | 318/254 |
| 4,899,073 A | * 2/1990 | Takeuchi et al. | 310/116 |
| 4,942,325 A | 7/1990 | Fukaya | 310/42 |
| 5,113,107 A | * 5/1992 | Atsumi et al. | 310/256 |
| 5,122,697 A | * 6/1992 | Horst | 310/181 |
| 5,126,605 A | * 6/1992 | Palmero | 310/36 |
| 5,260,620 A | * 11/1993 | Morrill | 310/185 |
| 5,373,207 A | * 12/1994 | Yamaguchi et al. | 310/81 |
| 5,996,554 A | * 12/1999 | Tojo et al. | 123/399 |

FOREIGN PATENT DOCUMENTS

| | | |
|---|---|---|
| DE | 37 42 502 A1 | 6/1989 |
| EP | 0 341 867 A1 | 11/1989 |

OTHER PUBLICATIONS

European Patent Office: European Search Report; Jan. 21, 2003.

* cited by examiner

Primary Examiner—Karl Tamai
Assistant Examiner—Guillermo Perez
(74) Attorney, Agent, or Firm—Thompson Coburn LLP

(57) ABSTRACT

An inexpensive, small, high-efficiency actuator having a single-phase claw pole structure permits easy assembly or winding and enables a rotor to act in a fixed direction by detent torque even in a deenergization mode. The actuator includes a stator yoke composed of a pair of substantially circular toroidal planar yokes formed of a soft magnetic material, polar teeth which axially protrude from inner peripheral edges of the respective planar yokes and which are disposed so that they face each other, extending in a circumferential direction, and a stator yoke that has a cylindrical ring provided on outer peripheral edges of the planar yokes; an armature being constituted by installing a coil formed by winding a magnet wire in a coil receiving section shaped like an annular recess formed by the planar yokes, the polar teeth, and the cylindrical ring of the stator yoke; and a stator assembly which has flanges with bearings provided on both end surfaces of the armature and in which a rotor provided with a magnet for a magnetic field composed of a permanent magnet being installed such that it faces the polar teeth of the stator with minute gaps provided therebetween; wherein the number of the polar tooth equals the number N of rotor magnetic poles (N is 2 or 4).

19 Claims, 7 Drawing Sheets

$Td = \frac{1}{2} \cdot Trate$

ANGLE (DEGREES)

$Td = \frac{1}{2} \cdot Trate$

ANGLE (DEGREES)

ACTUATOR WITH NUMBER OF STATOR TEETH EQUAL TO NUMBER OF ROTOR POLES

BACKGROUND OF THE INVENTION

1. Field of the Invention

The present invention relates to a structure of a single-phase, claw pole type actuator and, more particularly, to a small, high-efficiency actuator that permits easy assembly and features a large detent torque and stable rotational repetitive operation.

2. Description of the Related Art

A so-called toroidal actuator with a toroidal winding wrapped around an annular core is known as an actuator for controlling angles by performing rotational repetitive operation. The toroidal actuator scarcely has a cogging torque and allows angle control to be achieved with good controllability and responsivity. The cogging torque is a torque produced when a coil is in a deenergization mode and hereinafter is referred to as "detent torque". The toroidal actuator, however, has various problems in that the toroidal winding is difficult to wind and has so small detent torque that energizing current must be kept flowing or a spring or the like must be used to forcibly urge the actuator at all times in an initial state wherein no energization is performed in an application wherein a given direction of operation must be always maintained.

For this purpose, there is also a cross-coil actuator that has a D-shaped soft magnetic material which forms a magnetic circuit and which covers an entire outer periphery of a single-phase winding unit so as to impart a detent torque. This type of actuator, however, is disadvantageous in that it exhibits poor magnetic circuit efficiency and inevitably becomes large and also poses a problem in that an external shape thereof cannot be circular.

Thus, there have been demands for a small, inexpensive actuator designed to have such functions and characteristics as operation of maintaining a rotor in a given direction by an appropriate detent torque in an initial state, and of performing a given operation for a period of time that corresponds to a time of energization of a coil, and of inversely energizing the coil to forcibly set it back to the initial state, although the actuator is not required to conduct accurate angle control by a closed loop.

SUMMARY OF THE INVENTION

The present invention has been made with a view to solving the problems described above, and an object thereof is to provide an inexpensive, small, high-efficiency actuator that has a single-phase claw pole structure, features easy assembly or winding, and is capable of activating a rotor in a certain given direction by a detent torque in a deenergization mode.

To this end, according to a first aspect of the present invention, there is provided a claw pole type actuator of a single-phase structure, comprising: a stator yoke composed of a pair of substantially circular planar yokes formed of a soft magnetic material, a number N of polar teeth which axially protrude from inner peripheral edges of the respective planar yokes and which are disposed to face each other, extending in an axial direction, and a cylindrical ring provided on outer peripheral edges of one of the planar yokes; an armature being constituted by installing a coil formed by winding a magnet wire in a coil receiving section shaped like an annular recess formed by the planar yokes, the polar teeth, and the cylindrical ring of the stator yoke; a rotor being concentrically disposed within the stator yoke and being adapted for repetitive rotational movement within a set angular range in response to energization of said coil, said angular range being less than 360° and having its endpoints defined by a first angular position and a second angular position, and wherein said rotor is further adapted to be held in either said first angular position or said second angular position by a magnetic detent torque when said coil is deenergized, said rotor having a magnet, said magnet having a number N of magnetic poles; and a stator assembly which has flanges with bearings provided with a magnet for a magnetic field composed of a permanent magnet being installed to face the polar teeth of the stator with minute gaps provided therebetween; wherein the number of the polar teeth equals the number N of rotor magnetic poles (N is 2 or 4).

In a preferred form of the invention, the stator yoke is comprised of a first stator yoke in which a planar yoke and a polar tooth are combined into one piece, and a second stator yoke in which a planar yoke, polar teeth, and a cylindrical ring are combined into one piece, and the polar teeth in the first and second stator yokes are provide with the spacing of about respectively, are disposed at an interval of approximately 180 degrees in terms of an electrical angle.

In another preferred form of the invention, a pair of stator yokes, each being composed of the planar yoke and the cylindrical ring combined into one piece, are disposed to face each other.

In yet another preferred form of the invention, the rotation of the rotor is restricted by a stopper so that a maximum angle of the rotational motion stays within a range of 120/N to 240/N degrees (N is 2 or 4).

Preferably, the stopper is incorporated in the actuator.

In a further preferred form of the invention, a groove or a cut for destroying magnetic balance is provided on a central portion of one of the south pole and the north pole of the magnet for magnetic field.

In a further preferred form of the invention, the extensions of the two polar teeth in a circumferential direction are all the same and stay within a range of 220/N to 260/N degrees (N is 2 or 4) in terms of central angle.

In a further preferred form of the invention, air gaps in a radial direction formed by the polar teeth and the rotor magnet are uneven, and air gaps at central portions of the polar teeth are narrower than air gaps at ends of the polar teeth.

Preferably, the flange is composed of a nonmagnetic material.

In a further preferred form of the invention, a relationship between a detent torque Td (Nm) and a rated torque Trate (Nm) is as follows:

$$Trate/4 \leq Td \leq 3\, Trate/4$$

where Trate denotes a maximum torque value obtained when a rated current is caused to flow, and detent torque Td denotes a maximum torque when a coil is in a deenergization mode.

DETAILED DESCRIPTION OF THE PREFERRED EMBODIMENTS

Embodiments of an actuator having a single-phase claw pole structure in accordance with the present invention will now be described.

Figure 1:
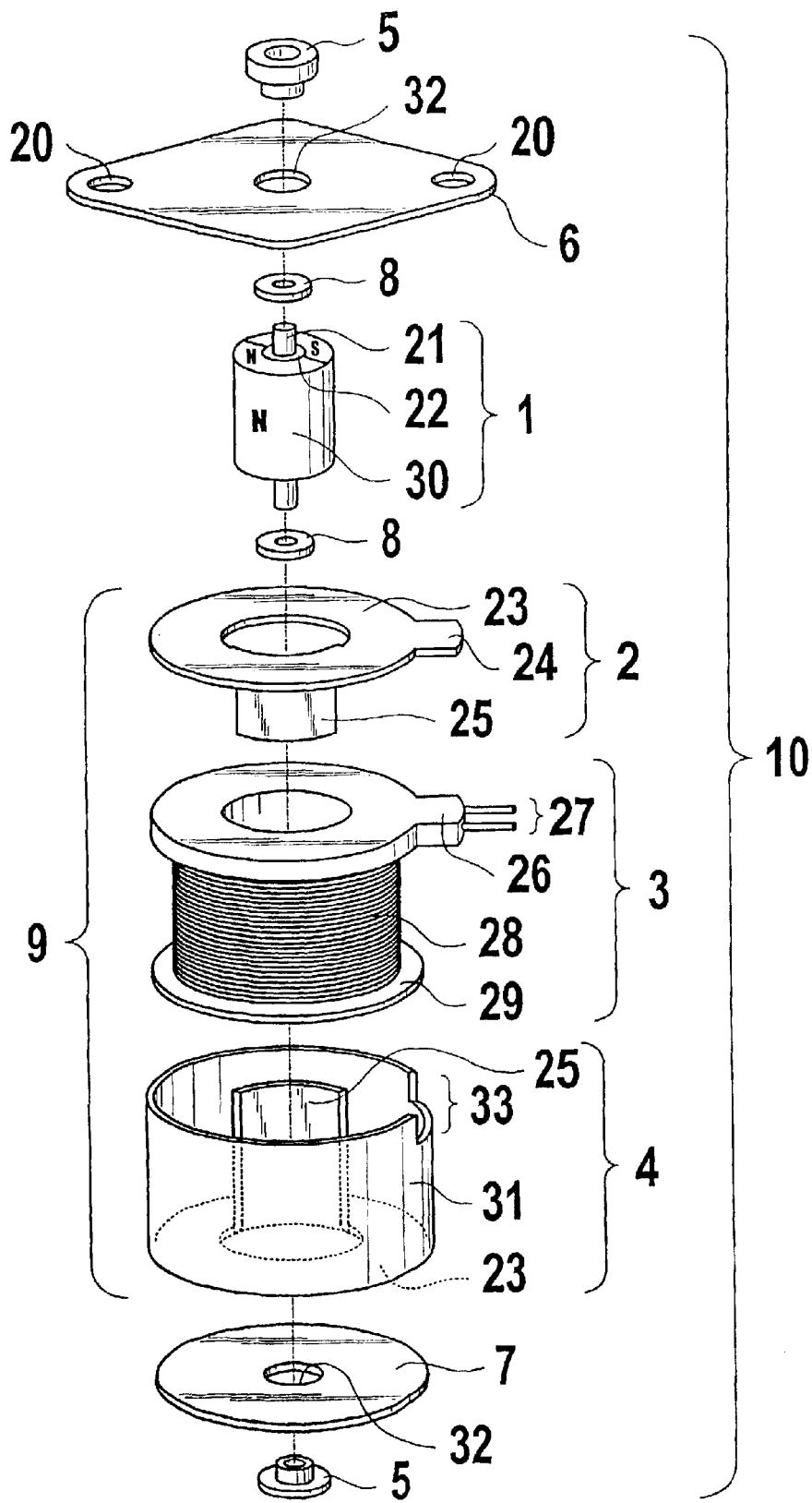
FIG. 1 is an exploded perspective view of an actuator according to a first embodiment of the present invention.

FIG. 1 is an exploded perspective view of an actuator according to a first embodiment of the present invention.

In the embodiment, a stator yoke is comprised of a first stator yoke 2 formed of a planar yoke section and a polar teeth section that are combined into one piece, and a second stator yoke 4 formed of a planar yoke section, a polar teeth section and a cylindrical ring section that are combined into one piece. The rotor of this embodiment has two magnetic poles by way of example.

An actuator 10 is constituted by four sections, namely, a rotor 1, an armature 9, upon and lower flanges 6 and 7 and bearings 5. The armature 9 is constituted by three sections, namely, a first stator yoke 2, a coil assembly 3, and a second stator yoke 4. The upper flange 6 is provided with mounting holes 20 for coupling to an external unit.

First, the rotor 1 is fixed by concentrically securing a magnet 30, which is magnetized to have two poles, to a rotary shaft 21 via a sleeve 22. In this embodiment, the magnet 30, the sleeve 22, and the rotary shaft 21 are fixed by adhesives.

The armature 9 is composed of the first stator yoke 2, the coil assembly 3, and the second stator yoke 4. The first stator yoke 2 is formed of a substantially toroidal planar yoke 23 and a polar tooth 25 that projects in an axial direction from an inner peripheral edge of the yoke 23 and extends in a circumferential direction, the yoke 23 and the polar tooth 25 being integrally formed. To be more specific, in this embodiment, the polar tooth is formed by vertically punching and raising a central portion of a disc-shaped soft magnetic steel plate (a pure iron or a galvanized steel. plate) in an axial direction. The planar yoke 23 shown in FIG. 1 is provided with a positioning projection 24 for establishing a circumferential positional relationship with respect to the second stator yoke 4, which will be explained hereinafter.

The coil assembly 3 is formed by winding a coil 28 around a resinous bobbin 29 (which may be for example, a liquid crystal polymer). In this embodiment, a terminal block 26 in which terminals 27 have been inserted is integrally resin-formed with a jaw of the bobbin 29. The terminal block 26 is designed to be fitted in a notch 33 formed on the upper edge of a cylindrical ring 31 of the second stator yoke 4, which will be discussed hereinafter.

The second stator yoke 4 is similar to the first stator yoke 2 in that the substantially disc-shaped planar yoke 23 is made integral with the polar tooth 25 that axially protrudes from an inner peripheral edge of the yoke 23 and extends in a circumferential direction, whereas the second stator yoke 4 differs from the first stator yoke 2 in that it is further provided with a cylindrical ring 31 which is integrally added to an outer peripheral edge of the planar yoke 23 in an axial direction by deep drawing such that it is parallel to the polar tooth 25. As previously mentioned, the cylindrical ring 31 of the second stator yoke 4 is provided with the notch 33 for performing circumferential positioning so that the polar tooth 25 of the first stator yoke 2 and the polar tooth 25 of the second stator yoke 4 have a phase difference of about 180 degrees in terms of an electrical angle. The terminal block 26 of the coil assembly 3 can be fitted in the notch 33.

The rotor 1 is arranged inside the actuator 9, and the bearings 5 are installed in central holes 32 of the upper and lower flanges 6 and 7, respectively, so that the rotor 1 is rotatably supported by the bearings 5. A spacer 8 is arranged for axial positioning of the magnet 30 of the rotor 1 and the polar teeth 25 and for adjusting an axial play. The upper and lower flanges 6 and 7 and the bearings 5 are fixed by adhesives, and the flanges 6 and 7 are fixed to the first and second stator yokes 2 and 4 by adhesives in this embodiment; however, they may be alternatively fixed by mechanical caulking, welding, resin integral molding, etc. Further alternatively, the flanges may be made by resin molding.

The principle of operation and torque characteristics of the actuator with the single-phase claw pole structure in accordance with the present invention will now be described.

Figure 2A:
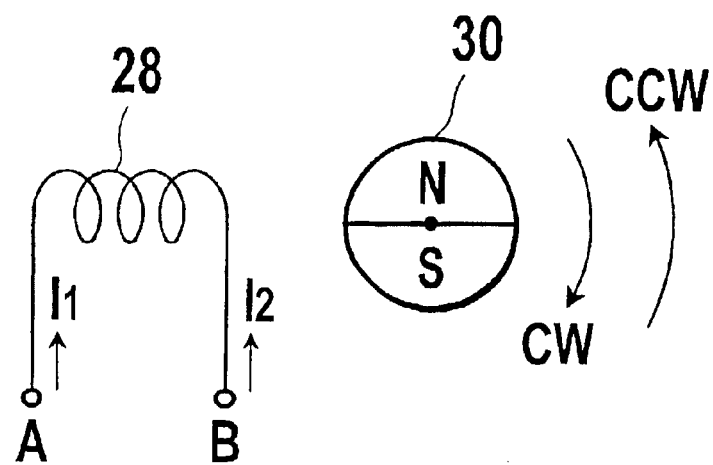
FIG. 2A is a schematic representation illustrating a principle of operation of an actuator in conjunction with unifiler winding and bipolar drive.
Figure 2B:
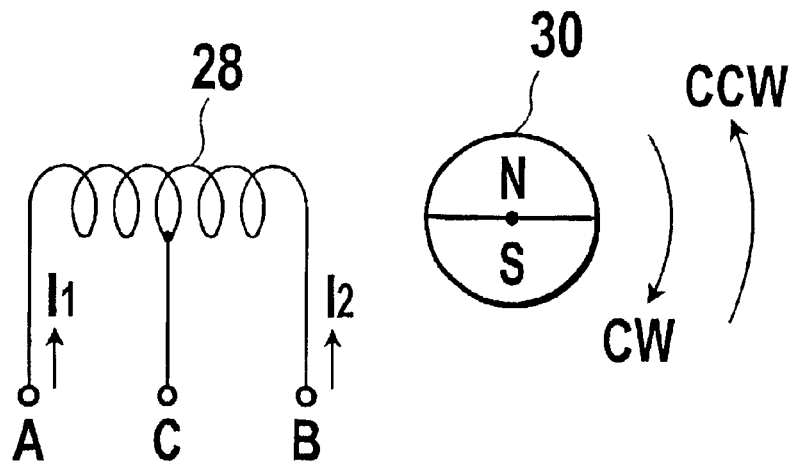
FIG. 2B is a schematic representation illustrating in conjunction with bifiler winding and unipolar drive.

FIG. 2A is a schematic representation illustrating a principle of operation of the actuator in accordance with the present invention in conjunction with unifiler winding and bipolar drive, and FIG. 2B is a schematic representation illustrating the principle of operation of the actuator in conjunction with the bifiler winding and unipolar drive.

The principle of operation of the unifiler winding combined with the bipolar drive illustrated in FIG. 2A and that of the bifiler winding combined with the unipolar drive illustrated in FIG. 2B are similar; hence, descriptions will be given by reference to FIG. 2A.

FIG. 2A shows the coil 28 that represents a stator section and the magnet 30 for magnetic field (hereinafter referred to simply as "the magnet 30") that represents a rotor section. The coil 28 has two modes, namely, one mode for passing a current $I_1$ from terminal A in a direction indicated by an arrow, and another mode for passing a current $I_2$ from terminal B in a direction indicated by the arrow. First, when the coil 28 is energized in the direction of $I_1$, then terminal B, which is near the magnet 30, will be energized to be the north pole. This causes the south pole end of the magnet 30 to be attracted to terminal B of the coil. As a result, a torque in a direction indicated by a clockwise (CW) arrow acts, and the magnet 30 stops with the south pole thereof facing terminal B of the coil 28, that is, the magnet rotates 90 degrees clockwise from a state of the magnet 30 shown in FIGS. 2A and 2B.

Conversely, if the coil 28 is energized in the direction of $I_2$, then terminal B, which is near the magnet 30, is energized to be the south pole. This causes the north pole end of the magnet 30 to be attracted to terminal B of the coil 28. As a result, a torque in a direction indicated by a counterclockwise (CCW) arrow acts, and the magnet 30 stops with the north pole thereof facing terminal B of the coil 28, that is, the magnet 30 rotates 90 degrees counterclockwise from a state of the magnet 30 shown in FIGS. 2A and 2B. Thus, in principle, if nothing restricts the rotation of the magnet 30, the actuator performs the 180-degree (±90 degrees) repetitive rotational motion by energization.

Figure 3:
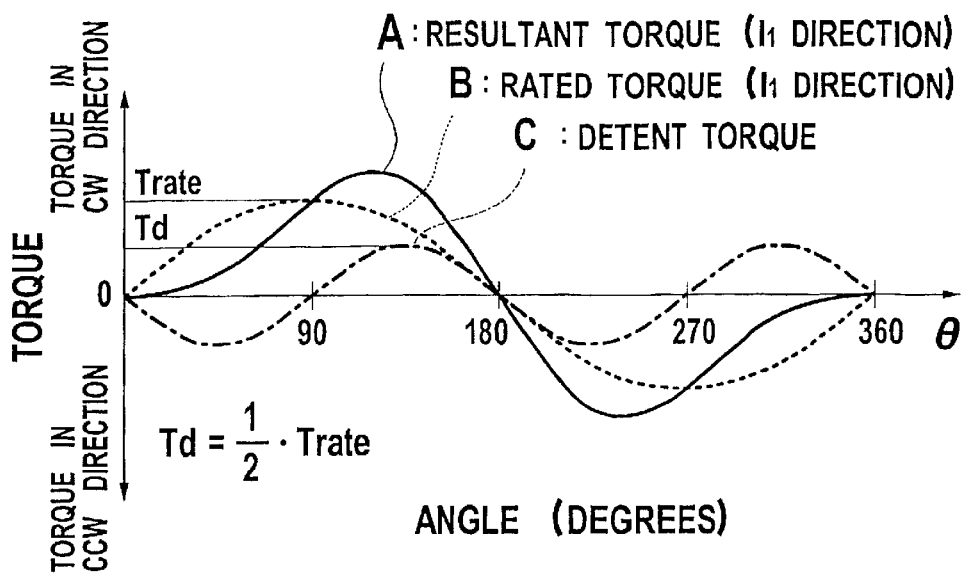
FIG. 3 shows a torque characteristic of the actuator in accordance with the present invention.
Figure 4:
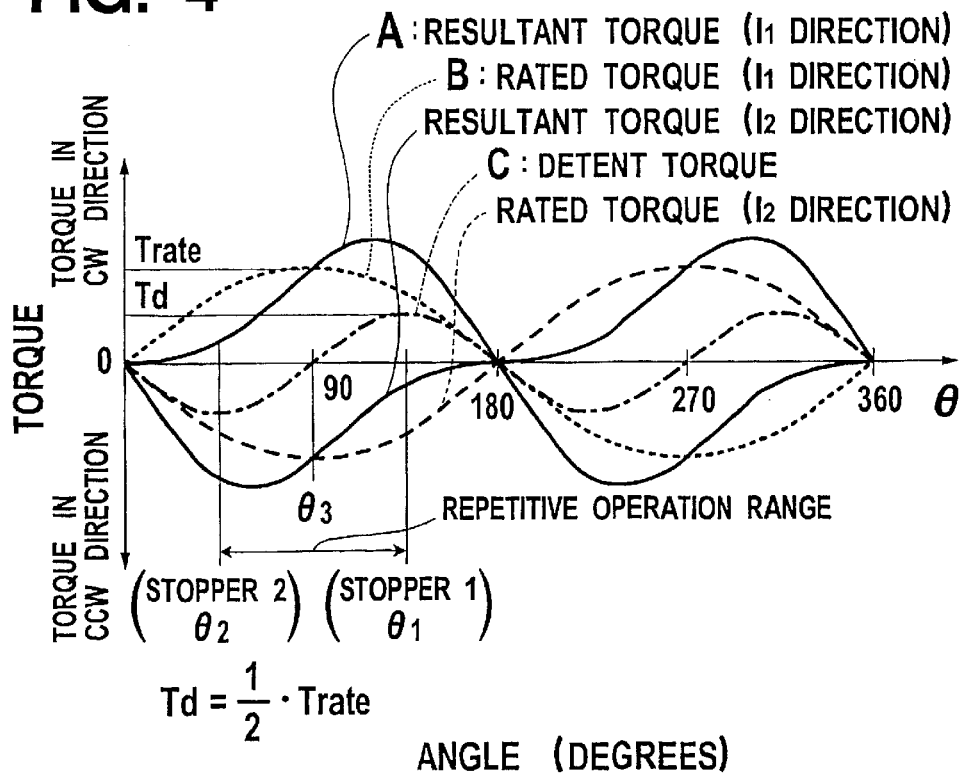
FIG. 4 shows a torque characteristic of the actuator in accordance with the present invention.
Figure 5:
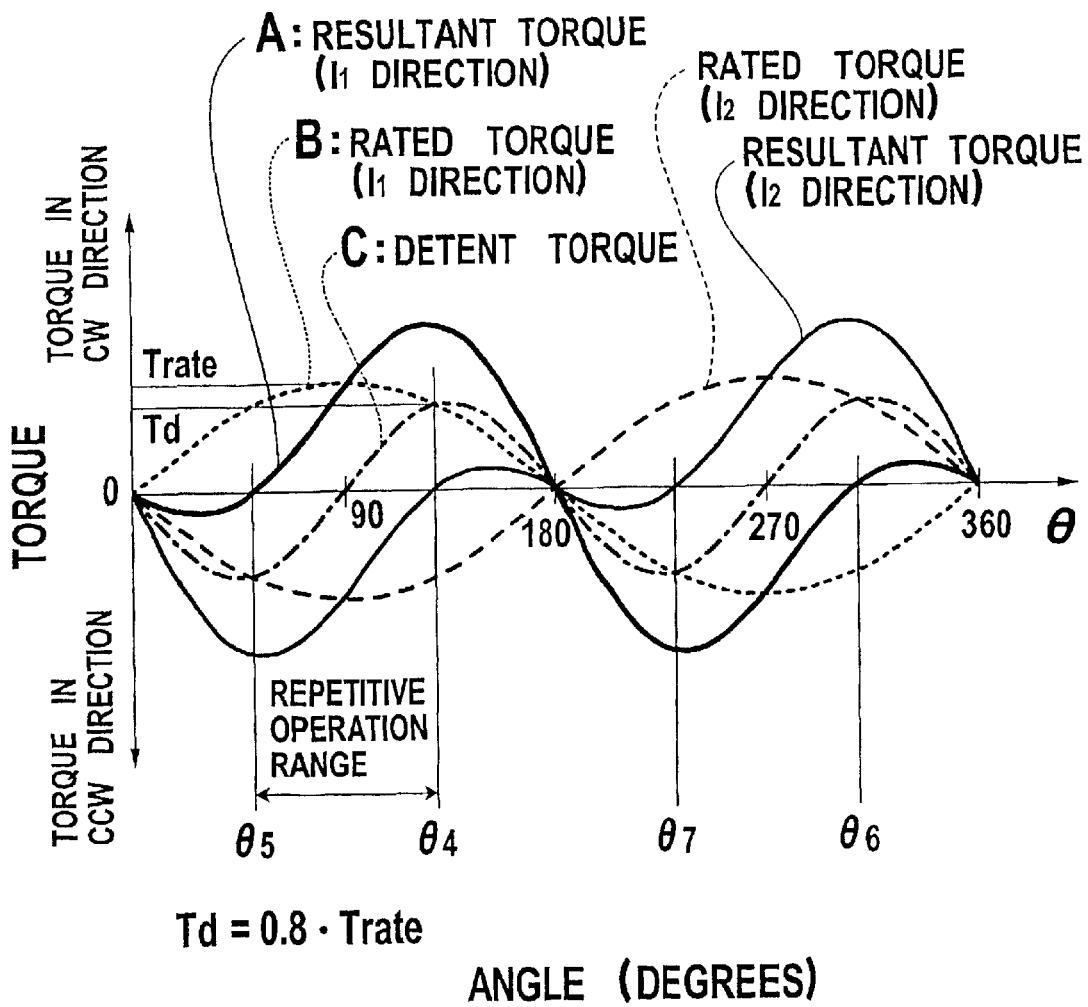
FIG. 5 shows a torque characteristic of the actuator in accordance with the present invention.

FIG. 3, FIG. 4, and FIG. 5 respectively show torque characteristics of the actuator in accordance with the present invention.

Since the actuator in accordance with the present invention has the claw pole structure, it has a detent torque in a deenergization mode. Therefore, if a friction torque is ignored, a resultant torque equals a sum of the detent torque and an energizing torque. In the present invention, a torque generated when the coil is energized at a rated current will be referred to as a "rated torque," and a maximum value thereof will be denoted as Trate. The relationships among these torques are shown in FIGS. 3, 4, and 5, among which FIGS. 3 and 4 illustrate typical torque characteristics of the first embodiment in which the detent torque (approximated to a sinusoidal wave, and the maximum value is denoted as Td) is half as much as a rated torque (approximated to a sinusoidal wave, and the maximum value is denoted as Trate), i.e. Td=Trate/2.

In FIGS. 3, 4, and 5, relative angle differences θ (represented in terms of angles (degrees) between the rotor and the stator) are shown on the axis of abscissa, and torque values (represented as "torque") associated with the relative angle differences θ are shown on the axis of ordinates. For the convenience of explanation, positive torque is defined as torque in the direction indicated by the clockwise arrow, while negative torque is defined as torque in the direction indicated by the counterclockwise arrow to associate them to the rotational directions of the rotor shown in FIGS. 2A and 2B. In FIGS. 3 and 4, solid lines A denote curves of resultant torques (current passes in the direction indicated by arrow $I_1$ in FIGS. 2A and 2B), dashed lines B denote curves of rated torques (the current passes also in the direction indicated by arrow $I_1$), and one-dot chain lines C denote curves of detent torques. FIG. 4 also shows a case wherein current passes in the direction indicated by arrow $I_2$ in addition to the case shown in FIG. 3. Referring to FIG. 3, if an angle θ ranges from 0 to 180 degrees (or from 180 to 360 degrees), then the resultant torque produced by current $I_1$ will be positive (or negative), and a torque in the clockwise (or counterclockwise) direction is generated, causing the magnet to rotate clockwise (or counterclockwise) and stop at a position where torque is zero, i.e. θ=180 (θ=180) degrees. Referring now to FIG. 4, if an angle θ ranges from 0 to 180 degrees (or from 180 to 360 degrees), then the resultant torque produced by current $I_2$ will be negative (or positive), and a torque in the counterclockwise (or clockwise) direction is generated, causing the magnet to rotate counterclockwise (or clockwise) and stop at a position where torque is zero, i.e. θ=0 (θ=360=0) degree. This coincides with the explanation given in conjunction with FIGS. 2A and 2B.

Descriptions will now be given of a relationship among detent torque, a repetitive rotational motion range, and a stopper, which is an important characteristic of the present invention.

This type of actuator is characterized in that detent torque Td is large in relation to rated torque Trate; hence, a unique operation is possible by making use of the detent torque, which will be discussed in detail later. On the other hand, the detent torque causes a curve of the resultant torque to be distorted as compared with a waveform of rated torque alone.

FIG. 5 shows a torque curve observed when detent torque Td is relatively large in comparison with rated torque Trate. More specifically, FIG. 5 shows a case wherein Td=0.8 Trate. As is obvious from FIG. 5, the curves of FIG. 5 are different from those of FIGS. 3 and 4 in that the curves of the resultant torques are distorted more. In addition, although the angles stay within the range of 0 to 180 degrees (or 180 to 360 degrees), the resultant torques turn to negative (or positive) in the range of 0 to $\theta_5$ (or 180 to $\theta_7$) degrees and the range of $\theta_4$ to 180 ($\theta_6$ to 360) degrees. This means that the actuator does not carry out the repetitive rotational motion unless the angles are within a range that is narrower than the range of $\theta_4$ to $\theta_5$. The reason is that the signs of all detent torque, resultant torque (in the $I_1$ direction), and the resultant torque (in the $I_2$ direction) agree with each other in the ranges of 0 to $\theta_5$ (or 180 to $\theta_7$) and $\theta_4$ to 180 ($\theta_6$ to 360) degrees, so that the rotor cannot be rotated against the detent torque regardless of a direction in which current is passed. Thus, in the present invention, relatively large detent torque Td tends to narrow the range of the repetitive rotational motion.

Referring back to FIG. 4, the relationship among the detent torque, the repetitive rotational motion range and the stopper will be described.

In FIG. 4, if it is assumed that an actuator has stopper 1 and stopper 2 at positions of $\theta_1$ and $\theta_2$, respectively, and the rotor is set so that it can perform repetitive motion only in a range from $\theta_1$ to $\theta_2$, then the actuator will perform a series of operations described below.

If the rotor lies between $\theta_3$ and $\theta_1$ ($\theta_2$ and $\theta_3$) when the coil is in the deenergization mode, then the detent torque is positive (or negative); hence, the rotor is rotated by a torque in the clockwise (or counterclockwise) direction and stopped at the position of $\theta_1$ (or $\theta_2$) of the stopper 1 (or the stopper 2) and held at the position. In this state, if current is continued to be passed in an $I_2$ (or $I_1$) direction, then the rotor overcomes a positive detent torque and generates a torque in the counterclockwise (or clockwise) direction and stops at the position of $\theta_2$ (or $\theta_1$) of the stopper 2. It is needless to say that, if duration of energization in the $I_2$ (or $I_1$) direction is short and current is cut off before the rotor reaches $\theta_3$, then the rotor is moved back to the initial position $\theta_1$ (or $\theta_2$) by a positive (or negative) detent torque.

If current in the $I_2$ (or $I_1$) direction is continued to be passed for a sufficiently long time and the energization is cut off after the rotor stops at $\theta_2$ (or $\theta_1$) of the stopper 2 (or the stopper 1), then the rotor is maintained at the position by a negative detent torque. In this state, if the current is switched to the $I_1$ (or $I_2$) direction, then the rotor overcomes the negative detent torque and generates a torque in the clockwise (or counterclockwise) direction to go back to the position of $\theta_1$ (or $\theta_2$) of the stopper 1 (or the stopper 2) and stops at the position.

Thus, according to the present invention, each time the energizing direction of the coil is switched, the rotor carries out repetitive motion in the range defined by $\theta_2$ and $\theta_1$, and the rotor can be set in a given direction by making use of detent torque even when the coil is in the deenergization mode. Obviously, by continuously changing the period of time during which the coil is energized, the operation time of the rotor can be continuously changed accordingly.

By utilizing the advantage described above, the present invention can be applied to, for example, a camera shutter or the like to always hold the shutter closed by the detent torque, open the shutter only for a required period of time by energizing a coil only when taking a photograph (for exposure), then close the shutter by inverse energization. Thereafter, the energization can be cut off to maintain the shutter in the closed state by the detent torque. This feature is extremely convenient to achieve power saving.

Regarding the repetitive motion range, in a preferred form of the invention, an external mechanism for forcibly restricting the rotation of the rotor (the mechanism is called the "stopper" in the invention) is provided. In the description given in conjunction with FIG. 4, the positions where the stoppers are set are defined as $\theta_1$ and $\theta_2$. However, the positions at which the stoppers are stopped may be extended to 180 degrees ($\theta_1$=180 degrees and $\theta_2$=0 degree) if there is no friction torque. In actual operation, however, there is friction torque or the like, and the friction torque cannot be overcome if a resultant torque stays small, leading to unstable operation. According to experiment results, in order to secure stable operation, a limit value is 240/N degrees when the number of magnets for magnetic field is N. Furthermore, as shown in FIG. 5, if the detent torque is large, then a negative resultant torque range is theoretically produced as already explained, and the setting range of the repetitive motion is unavoidably narrowed. Although it is desirable to provide a broader repetitive motion range, a compromise must be made in relation to a required detent torque. To be more specific, if a larger initial torque in the deenergization mode is required, then the repetitive motion range inevitably becomes narrower. For this reason, in the invention, appropriate angles at which the stoppers are disposed range from 120/N to 240/N degrees in terms of central angle.

Figure 6:
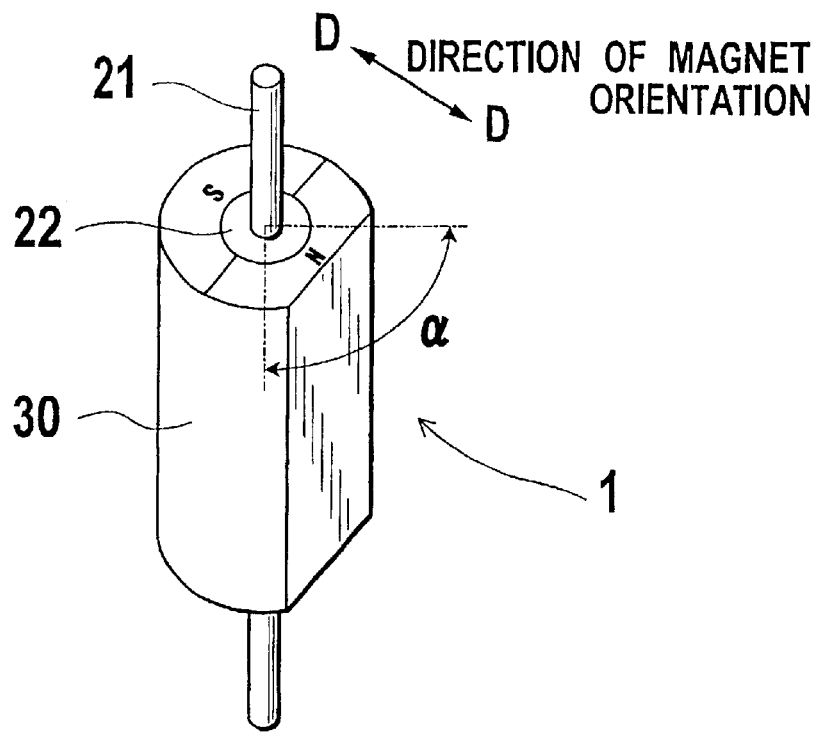
FIG. 6 is a perspective view showing a second embodiment of the present invention.

FIG. 6 is a perspective view of a second embodiment characterized by the magnet 30.

An example of a method for securing a broader repetitive motion range will be explained with reference to FIG. 6. In case of FIG. 6, N is 2. As illustrated, a central portion at the north pole in the cylindrical magnet 30 is axially cut to forcibly destroy magnetic balance between the north pole and the south pole. According to experimental results, the repetitive motion range which was 60 degrees in the absence of the cut was nearly doubled but 110 degrees in the presence of the cut. The experiment results have also, revealed that a cut amount denoted by preferably ranges from 45 to 80 degrees, because an excessively small cut provides less imbalance effect, whereas an excessively large cut leads to a considerably reduced magnetic fluxes with consequent marked deterioration in characteristics. The cut in the north pole portion shown in FIG. 6 is positioned parallel to the neutral. However, the cut may be provided at the south pole end, or the cut may be slightly inclined with respect to the neutral in order to increase detent torque. The magnet shown in FIG. 6 is magnetically oriented in directions of D—D indicated by the arrows. However, cutting the magnet to be isotropic will also provide a similar advantage. Alternatively, the magnet may be provided with a uniform, narrow groove in an axial direction that is, for example, one to three times as long as an air gap and has a depth which is approximately equivalent to the length of the air gap. Further alternatively, a stopper (to be discussed in detail with reference to FIG. 8A) integrally formed on an end surface of a magnet for magnetic field may be provided with a groove or a cut having the same effect.

Figure 7:
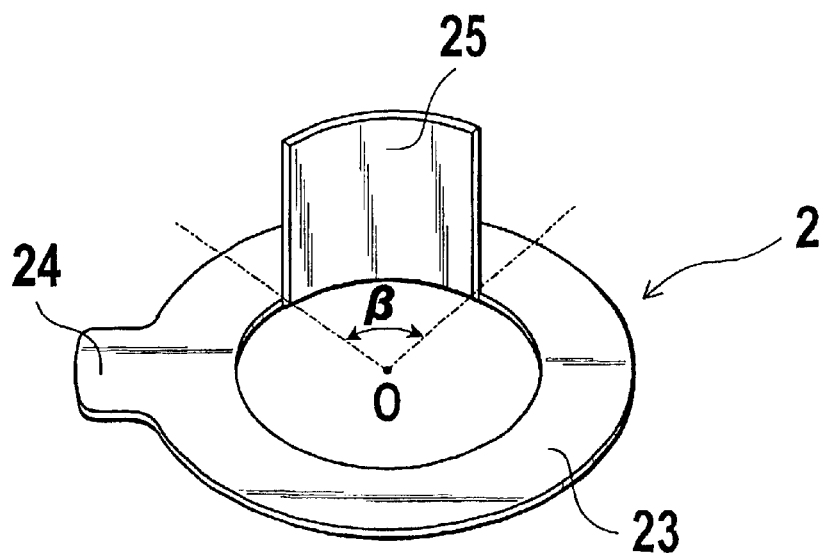
FIG. 7 is a perspective view showing a third embodiment of the present invention.

FIG. 7 is a perspective view of a third embodiment of the present invention that is characterized by a stator yoke.

Another embodiment for securing a broader repetitive motion range will be described in conjunction with FIG. 7 which is an enlarged view of the first stator yoke 2 of the first embodiment. The number N of magnetic poles of the magnet for magnetic field in the third embodiment is 2. Referring to FIG. 7, a polar tooth 25 is a polar tooth of a straight configuration that has an even wall thickness, a central angle $\beta$, and the same central angle in an axial direction. The central angle $\beta$ of the polar tooth 25 must be set to an appropriate value to adequately supplement magnetic fluxes of the magnet 30 for magnetic field (hereinafter referred to simply as "the magnet"). Experimental results have indicated that polar tooth 25 of first and second stator yokes preferably share the same configuration and the central angles $\beta$ thereof preferably range from 220/N to 260/N degrees in order to secure a wider repetitive motion range. The polar tooth 25 are not limited to the straight type shown in FIGS. 1 and 7 in configuration. They may be triangular or trapezoidal. In such a case, the central angle $\beta$ means an angle of a root portion, i.e. a junction to a planar yoke. Polar teeth with tapered tips as in the case of triangular teeth, trapezoidal teeth, etc. tend to provide increased detent torque, making themselves suitable for applications where large detent torque is required.

Figure 10:
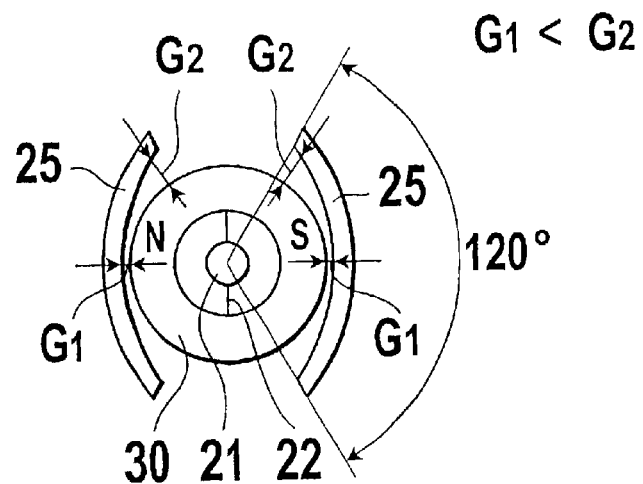
FIG. 10 is a sectional view showing a fourth embodiment of the present invention.

FIG. 10 is a sectional view of a fourth embodiment characterized by a magnetic circuit.

Still another embodiment for securing a stable, broader repetitive motion range will be described in conjunction with FIG. 10. The sectional view in FIG. 10 has been taken perpendicularly to a rotary shaft 21 so as to show an air gap in a radial direction between polar tooth 25 and a magnet 30 for magnetic field. Components such as a coil, a bearing, a ring, and a planar yoke that are unnecessary for the explanation have been omitted. As illustrated in the drawing, the magnet 30 is circular, and the polar tooth 25 are composed of a uniform wall thickness. It can be seen that the air gaps in a circumferential direction are formed such that they are narrower at central gaps G1 and gradually become wider toward end gaps G2. With this arrangement, the phase of a stability point of detent torque agrees with that of a stability point of exciting torque, permitting a stable, broader repetitive motion range to be secured. It is needless to say that this embodiment may be combined with a technique of the groove or cut, or a technique of the angle $\beta$ of the polar tooth shown in FIG. 7.

Descriptions will now be given of an actuator in which a stopper mechanism is installed. As previously mentioned, it is preferable to accurately install a mechanism for restricting rotation somewhere in the actuator in accordance with the present invention. Incorporating the stopper in the actuator permits space saving to be accomplished and also markedly improves easeness of use.

Figure 8A:
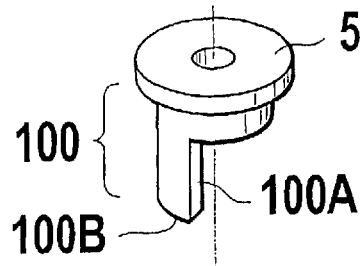
FIG. 8A is a perspective view showing a bearing of a fifth embodiment of the present invention.
Figure 8B:
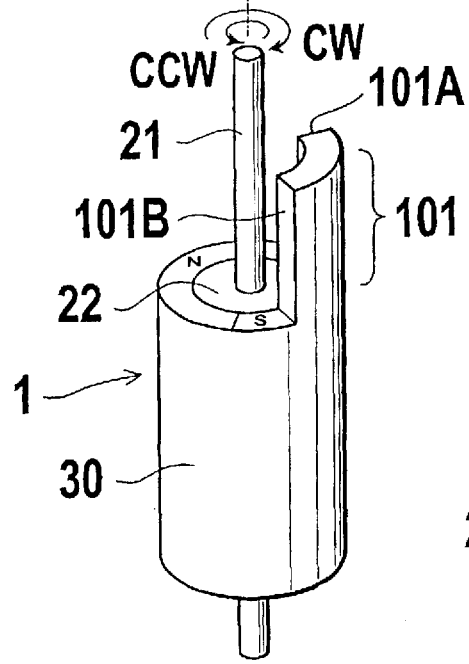
FIG. 8B is a perspective view showing a rotor of the fifth embodiment.

FIG. 8A is a perspective view of a bearing of a fifth embodiment that shows an example of a configuration of a stopper included in an actuator, and FIG. 8B is a perspective view of a rotor of the fifth embodiment.

The illustrated embodiment functions as a stopper by a protuberance added to an end surface of the bearing and a protuberance added to an end surface of a magnet, which restrict each other. First, referring to FIG. 8A, a first stopper protuberance 100 is integrally added to an end surface of a bearing 5. In FIG. 8B, a second stopper protuberance 101 is integrally added to an end surface of a magnet 30 for magnetic field (hereinafter referred to simply as "the magnet 30"). When these two stopper protuberances are combined, as a rotor rotates in a clockwise direction (CW) indicated an arrow, the rotor 1 stops at a position where a surface 100B of the protuberance 100 of the bearing 5 comes in contact with a surface 101B of the protuberance 101 of the magnet 30. Conversely, as the rotor 1 rotates in a counterclockwise direction (CCW) indicated an arrow, the rotor 1 stops at a position where a surface 100A of the protuberance 100 of the bearing 5 comes in contact with a surface 101A of the protuberance 101 of the magnet 30. At this time, the repetitive motion range can be set as desired by means of central angles of the respective protuberances 100 and 101. In this embodiment, the protuberances functioning as the stoppers are integrally formed on the bearing 5 and the magnet 30. However, the protuberances may be constituted by adding a third part. It is needless to say that the components on which the stoppers are formed are not limited to the bearing 5 and the magnet 30. The stoppers may be formed by combining a part of the stator section of the actuator, e.g., the polar teeth 25, the flange 6 or the flange 7, the bobbin 29, the planar yoke 23, with a part of the rotor section, e.g., the sleeve 22 or the rotary shaft 21.

It has previously been mentioned that the presence of friction torque causes inconveniences such as a narrower repetitive motion range. In order to reduce the friction torque and to obtain a broader repetitive motion range and stable operation, it is effective to avoid forming a magnetic circuit by using a nonmagnetic material for the upper and lower flanges 6 and 7 on both ends of the actuator 10. This is because, if the flanges are composed of a magnetic material, then a force is generated that constantly attracts the magnet 30 toward a flange surface with a smaller gap due to leakage magnetic fluxes produced at an end surface of the magnet 30. As a result, an end surface of the magnet 30 is magnetically drawn toward and comes in contact with an end surface of the bearing 5, generating frictional load during a rotational motion. The attracting force is not produced if the flanges are nonmagnetic, or even if such a force is produced, it will be small enough to ignore. The effect is especially noticeable in the case of a magnet of a rare earth type (e.g. sintered Nd—Fe—B magnet). For the same reason, it is desirable to use a nonmagnetic or nonferrous oil-impregnated metal for the bearing 5.

Descriptions will now be given of a relationship between an appropriate detent torque Td and a rated torque Trate.

As has been explained in conjunction with FIGS. 3, 4, and 5, the repetitive motion range tends to be narrower as the detent torque Td approaches the rated torque Trate. The repetitive motion range becomes narrow especially if Td>3 Trate/4. Conversely, if Td<<Trate, then the detent torque is too small, leading to a shortcoming in which the actuator cannot be maintained in a given direction in a deenergization mode. Therefore, to maintain the actuator in the given direction, an energization holding mode in which current is continued to flow through a coil must be implemented, which is undesirable from the standpoint of energy saving. Forcibly retaining the rotor in a certain position by using a spring would add to cost. Thus, studies on various aspects carried out for the present invention have revealed that a relationship between the detent torque Td and the rated torque Trate given below is desirable for the actuator:

$$Trate/4 \leq Td \leq 3Trate/4$$

Lastly, in the first embodiment shown in FIG. 1, the first stator yoke 2 has the polar tooth 25 and the planar yoke 23 formed into one piece, and the second stator yoke 4 also has the polar tooth 25, the planar yoke 23, and the cylindrical ring 31 formed into one piece. In the present invention, however, the major parts of the stator yokes may not be integrally formed as mentioned above.

Figure 9:
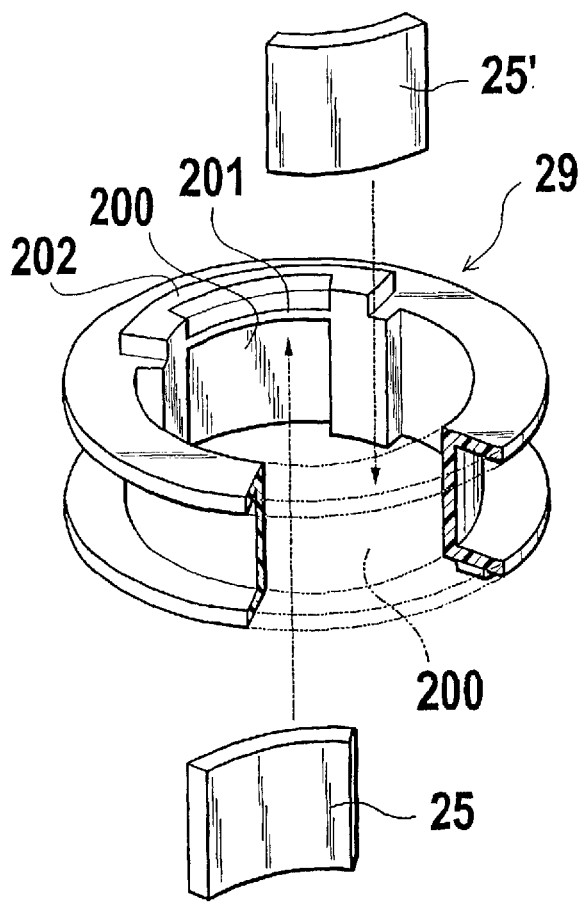
FIG. 9 is a perspective view showing a sixth embodiment of the present invention.

FIG. 9 is a perspective view of a sixth embodiment showing structures of discrete stator yokes.

In the sixth embodiment, a first stator yoke 2 is composed of a planar yoke 23 (not shown) and a polar tooth 25 that are discrete, and a second stator yoke 4 (not shown, see FIG. 1) is composed of a planar yoke 23 (not shown), a polar tooth 25, and a ring 31 (not shown) that are discrete. A bobbin 29 has two guiding grooves 200 (the one on the front side is cut and not shown) for retaining the polar tooth (of the straight shape in the drawing) 25, the two guiding grooves 200 being disposed at equidistantly in a circumferential direction. Portions of the guiding grooves 200 that come in contact with distal ends of the polar tooth 25 are provided with springy beams 201. With this arrangement, by setting the depth of the grooves 200 so that it is slightly shorter than an axial length of the polar tooth 25, a stable state of contact between the polar tooth 25 and the planar yoke 23 (not shown) can be achieved even if there are slight variations in length, thus providing a stator yoke structure that restrains deterioration in magnetic efficiency even when the polar tooth 25 and the planar yoke 23 are separated. Furthermore, guides 202 are provided on top and bottom end surfaces of the bobbin 29, so that the guides 202 fit in the planar yoke 23, thereby permitting the polar tooth 25 to be positioned. The bobbin in which the polar tooth 25 have been inserted and which has been provided with windings is inserted in the cylindrical ring 31 (not shown), then the outer peripheries of the planar yoke 23 are fitted in the inner periphery of the ring 31 at both end surfaces thereof to fix these components, thus completing an armature. The structure is especially advantageous in such a case where the axial dimension of the polar tooth 25 need to be long or the thickness of the polar tooth 25 need to be large, since the polar tooth 25 can be used in a discrete form.

Figure 11:
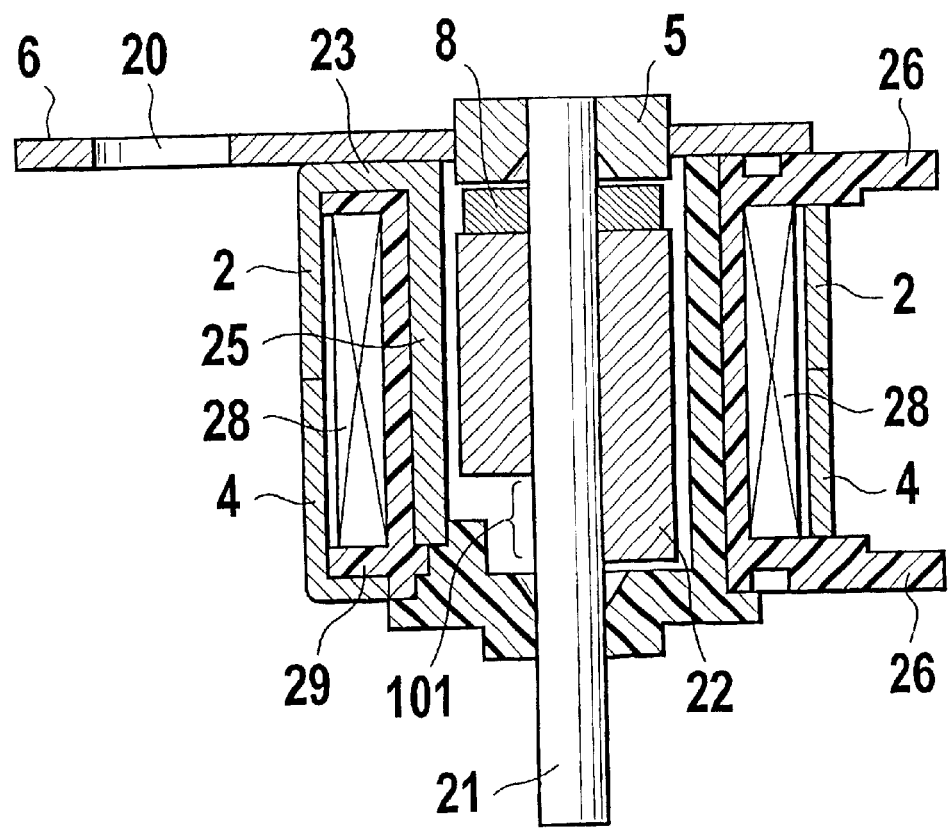
FIG. 11 is a sectional view showing a seventh embodiment of the present invention.

FIG. 11 is a sectional view of a seventh embodiment of the present invention.

In the drawing, like reference numerals as those in FIG. 1 denote like components. The seventh embodiment employs a pair of stator yokes having planar yokes 23 and cylindrical rings 31 that are integrally formed, a lower flange being made integral with the stator yokes by resin molding. With this arrangement, the number of components can be reduced, and concentricity of the stator yokes and a bearing can be improved.

Thus, according to the present invention, an actuator having unique characteristics that provides large detent torque can be implemented by employing an armature that has a simple structure and an inexpensive single-phase claw pole structure. It is obvious that use of the armature having the claw pole structure that features a round external configuration permits easy assembly and high magnetic efficiency.

Moreover, the actuator allows a rotor thereof to be always urged by detent torque in a given direction in a deenergization mode, thus contributing power saving. There is another advantage in that the stopper mechanism is incorporated in the actuator to permit space saving.

What is claimed is:

1. A claw pole type actuator of a single-phase structure, comprising:
   a stator yoke composed of a pair of substantially circular planar yokes formed of a soft magnetic material, a number N of polar teeth which axially protrude from inner peripheral edges of the respective planar yokes and which are disposed to face each other, extending in an axial direction, wherein each of said polar teeth has the same circumferential length, wherein said polar teeth stay within a range of 220/N to 260/N degrees at central angle, and wherein said polar teeth are disposed respectively at a spacing of approximately 180 degrees in terms of an electrical angle, and a cylindrical ring provided on outer peripheral edges of one of said planar yokes;

an armature being constituted by installing a coil formed by winding a magnetic wire in a coil receiving section shaped like an annular recess formed by said planar yokes, said polar teeth, and said cylindrical ring of said stator yoke;

a rotor being concentrically disposed within the stator yoke and being adapted for repetitive rotational movement within a set angular range in response to energization of said coil, said angular range being less than 360° and having its endpoints defined by a first angular position and a second angular position, and wherein said rotor is further adapted to be held in either said first angular position or said second angular position by a magnetic detent torque when said coil is deenergized, said rotor having a magnet, said magnet having a number N of magnetic poles, wherein a relationship between said detent torque and a rated torque is expressed as Trate/4≦Td≦3*Trate/4, wherein Trate denotes a maximum torque value in Nm when a rated current is passed, and wherein Td denotes a maximum torque value in Nm when a coil is in a deenergization mode; and a stator assembly which has flanges with a bearing provided on both end surfaces of said armature and in which said rotor being installed to face said polar teeth of said stator with a minute gap provided therebetween, wherein said flanges are composed of a nonmagnetic material;

wherein a number of said polar teeth equals the number N of rotor magnetic poles.

2. An actuator according to claim 1, wherein said stator yoke is comprised of a first stator yoke in which a planar yoke and a polar tooth are combined into one piece, and a second stator yoke in which a planar yoke, a polar tooth and a cylindrical ring are combined into one piece.

3. An actuator according to claim 1, wherein a pair of stator yokes, each being composed of said planar yoke and said cylindrical ring that are combined into one piece, are disposed to face each other.

4. An actuator according to claim 1, wherein a rotation of said rotor is restricted by a stopper so that a maximum angle of the rotational motion stays within a range of 120/N to 240/N degrees.

5. An actuator according to claim 4, wherein said stopper is incorporated in said actuator.

6. An actuator according to claim 1, wherein air gaps in a radial direction formed by said polar teeth and said rotor magnet are uneven, and air gaps at central portions of said polar teeth are narrower than air gaps at ends of said polar teeth.

7. An actuator according to claim 1, wherein the number of rotor magnetic poles is two.

8. An actuator according to claim 1, wherein said bearings are composed of a nonmagnetic material or a nonferrous oil-impregnated metal.

9. An actuator according to claim 1, wherein said actuator is implemented as an actuator for a shutter of a camera.

10. An actuator according to claim 12, wherein said flanges are composed of a nonmagnetic material.

11. An actuator according to claim 12, wherein said bearings are composed of a nonmagnetic material or a nonferrous oil-impregnated metal.

12. A claw pole type actuator of a single-phase structure, said actuator comprising:

stator yoke composed of a pair of substantially circular planar yokes formed of a soft magnetic material, a number N of polar teeth which axially protrude from inner peripheral edges of the respective planar yokes and which are disposed to face each other, extending in an axial direction, and a cylindrical ring provided along the outer peripheral edge of one of said planar yokes;

an armature being constituted by installing a coil formed by winding a magnetic wire in a coil receiving section shaped like an annular recess formed by said planar yokes, said polar teeth, and said cylindrical ring of said stator yoke;

a rotor being concentrically disposed within the stator yoke and being adapted for repetitive rotational movement within a set angular range in response to energization of said coil, said angular range being less than 360 degrees and having its endpoints defined by a first angular position and a second angular position, and wherein said rotor is further adapted to be held in either said first angular position or said second angular position by a magnetic detent torque when said coil is deenergized, said rotor having a substantially cylindrical magnet, said magnet having a number of magnetic poles equal to the number N of said polar teeth, and wherein either magnetic pole of said magnet is axially cut to forcibly destroy magnetic balance between the magnetic poles; and a stator assembly which has flanges with a bearing provided on both end surfaces said armature, and in which said rotor is installed to face said polar teeth with a minute gap provided therebetween.

13. An actuator according to claim 12, wherein the number of rotor magnetic poles is two.

14. An actuator according to claim 12, wherein said stator yoke is comprised of a first stator yoke in which a planar yoke and a polar tooth are combined into one piece, and a second stator yoke in which a planar yoke, a polar tooth, and a cylindrical ring are combined into one piece, and wherein said polar teeth are respectively disposed at a spacing of approximately 180 degrees in terms of an electrical angle.

15. An actuator according to claim 12, wherein a pair of stator yokes, each being composed of said planar yoke and said cylindrical ring that are combined into one piece, are disposed to face each other.

16. An actuator according to claim 12, wherein the cut of said magnet is set within a range of 45 degrees to 80 degrees at central angle.

17. An actuator according to claim 12, wherein the cut of said magnet is positioned parallel to the neutral of said magnet.

18. An actuator according to claim 12, wherein the north pole of said magnet is axially cut.

19. An actuator according to claim 12, wherein the south pole of said magnet is axially cut.

* * * * *